(12) United States Patent
Van Laere

(10) Patent No.: US 12,292,334 B2
(45) Date of Patent: May 6, 2025

(54) THERMAL INFRARED SENSOR THAT CAN BE FIXED ONTO INFRARED WINDOWS

(71) Applicant: Maarten Van Laere, Heverlee (BE)

(72) Inventor: Maarten Van Laere, Heverlee (BE)

(73) Assignee: ALPINCO BV, Zaventem (BE)

( * ) Notice: Subject to any disclaimer, the term of this patent is extended or adjusted under 35 U.S.C. 154(b) by 174 days.

(21) Appl. No.: 16/684,556

(22) Filed: Nov. 14, 2019

(65) Prior Publication Data

US 2020/0149971 A1 May 14, 2020

Related U.S. Application Data

(60) Provisional application No. 62/767,187, filed on Nov. 14, 2018.

(51) Int. Cl.
*G01J 5/08* (2022.01)
*G01J 5/00* (2022.01)
*G01J 5/0875* (2022.01)
*G01J 5/10* (2006.01)

(52) U.S. Cl.
CPC ........... *G01J 5/0875* (2013.01); *G01J 5/0003* (2013.01); *G01J 5/10* (2013.01); *G01J 2005/0077* (2013.01)

(58) Field of Classification Search
None
See application file for complete search history.

(56) References Cited

U.S. PATENT DOCUMENTS

| 2010/0020389 A1* | 1/2010 | Schmidt | G02B 7/24 359/350 |
| 2014/0218817 A1* | 8/2014 | Gunell | G02B 7/00 29/428 |
| 2015/0379361 A1* | 12/2015 | Boulanger | H04N 23/11 701/2 |

FOREIGN PATENT DOCUMENTS

WO    WO-9535643 A1 * 12/1995 ................ G01J 5/02

* cited by examiner

*Primary Examiner* — Erica S Lin
(74) *Attorney, Agent, or Firm* — White-Welker & Welker, LLC; Matthew T. Welker, Esq.

(57) ABSTRACT

A thermal infrared sensor with a mount so that it can be fixed onto infrared windows to provide a solution for performing continuous thermal monitoring of equipment that is provisioned with one or more infrared windows. The IR mount can be made out of any material or combination thereof. The mount can be attached in any possible form to the Infrared window or enclosure surrounding the Infrared window. The mount can fully or partially cover the Infrared window to be monitored. Depending on its implementation it could also fully or partially cover more than just one infrared window. The mount can be a mount made specifically for one or more types of Infrared windows or a generic mount. It could be an existing mount that could be used in such a way that when combined with the second element it enables the presented invention.

10 Claims, 3 Drawing Sheets

THERMAL INFRARED SENSOR THAT CAN BE FIXED ONTO INFRARED WINDOWS

FEDERALLY SPONSORED RESEARCH

Not Applicable

SEQUENCE LISTING OR PROGRAM

Not Applicable

TECHNICAL FIELD OF THE PRESENT INVENTION

The present invention relates generally to a temperature sensor. More specifically, the present invention relates to an infrared window mountable thermal infrared sensor that provides a solution for performing continuous thermal infrared monitoring of equipment that is provisioned with such windows (herein after named Infrared windows).

BACKGROUND OF THE PRESENT INVENTION

An Infrared Inspection Window is a window that is used to separate environments of differing pressures or temperatures while allowing light energy at a specified electromagnetic wavelength to pass between the two environments. IR Windows are also called viewports or viewing panes and must meet the strength and environmental requirements for the type of equipment in which they are fitted. The windows must also be compatible with the infrared equipment being used. The windows can be various shapes and sizes (square, round, rectangular or custom). IR windows are an inspection point that is designed to allow infrared radiation to transmit to the outside environment so that a data point can be recorded using a thermal camera.

The present invention teaches an infrared window mountable thermal infrared sensor. This provides a solution for performing continuous thermal infrared monitoring of equipment that is provisioned with such windows (herein after named Infrared windows).

SUMMARY OF THE PRESENT INVENTION

The invention generally relates to a thermal infrared sensor which is mounted in any possible way onto one or more Infrared windows.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a solution for continuous monitoring of thermal conditions through an infrared window. Currently one uses handheld thermal infrared devices that are put onto Infrared windows to monitor the temperature inside the equipment. With this new invention a thermal infrared sensor is mounted onto present Infrared windows to automate the process of monitoring temperature; on a temporary or permanent basis.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

Various other objects, features and attendant advantages of the present invention will become fully appreciated as the same becomes better understood when considered in conjunction with the accompanying drawings, in which like reference characters designate the same or similar parts throughout the several views, and wherein.

DEFINITIONS

Figure 1:
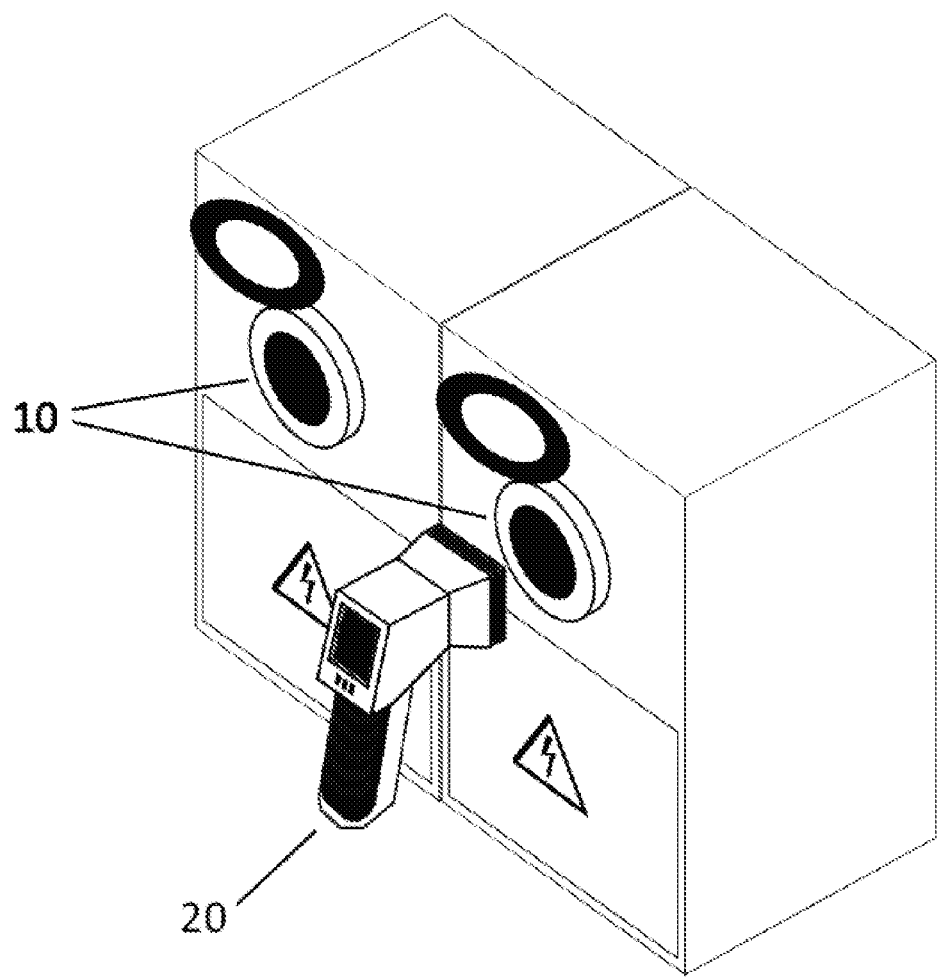
FIG. 1 is a side perspective view of the present invention. This figure shows how currently inspections are done using hand held thermal cameras (1) through mounted infrared windows (2) in equipment.

An infrared window is an engineered optic designed to permit infrared inspections of electrical components located within switchgear enclosures. Infrared windows consist of a metal or plastic frame that supports an infrared transmissive optic.

INDEX OF ELEMENTS

10: Infrared window Mount
20: Hand held thermal infrared camera
30: Thermal Infrared Sensor

DETAILED DESCRIPTION OF THE PRESENT INVENTION

In the following detailed description of the present invention of exemplary embodiments of the present invention, reference is made to the accompanying drawings (where like numbers represent like elements), which form a part hereof, and in which is shown by way of illustration specific exemplary embodiments in which the present invention may be practiced. These embodiments are described in sufficient detail to enable those skilled in the art to practice the present invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques known to one of ordinary skill in the art have not been shown in detail in order not to obscure the present invention. Referring to the figures, it is possible to see the various major elements constituting the apparatus of the present invention.

Now referring to the Figures, in which similar reference characters denote similar elements throughout the several views, the figures illustrate a thermal infrared sensor with a mount so that it can be fixed onto infrared windows to provide a solution for performing continuous thermal monitoring of equipment that is provisioned with one or more infrared windows.

Turning now descriptively to the drawings, in which similar reference characters denote similar elements throughout the several views, the figures illustrate thermal infrared sensor that is mounted in any possible way onto one or more Infrared windows.

The first element of the invention is a mount kit that can be fitted in any form onto an Infrared window. The Infrared Window Mount (IR mount) is an enclosure that fits either onto, around or over an Infrared window.

The IR mount can be made out of any material or combination thereof. The mount can be attached in any possible form to the Infrared window or enclosure surrounding the Infrared window. The mount can fully or partially cover the Infrared window to be monitored. Depending on its implementation it could also fully or partially cover more than just one infrared window. The mount can be a mount made specifically for one or more types of Infrared windows or a generic mount. It could be an existing mount that could be used in such a way that when combined with the second element it enables the presented invention.

The second element part of the invention is a thermal infrared sensor that can be included into the same or a different enclosure with the first main element (Infrared window mount). The sensor could be fixed or as in FIG. 3 clicked, slided into, or mounted in any other way into the first element.

An infrared sensor is an electronic instrument that is used to sense the temperature of one or more objects by detecting the emitted infrared radiation. The sensor can be a separate device compared to the first element or it can be part of the first element.

The thermal infrared sensor as intended in this invention can be one or more spot sensors, one or more thermal cameras or any combination thereof.

The first and second element can be connected into any possible way. Examples of such connections are glue, screws, magnets, fits and any other way where the second element can be attached onto the first element.

Figure 2:
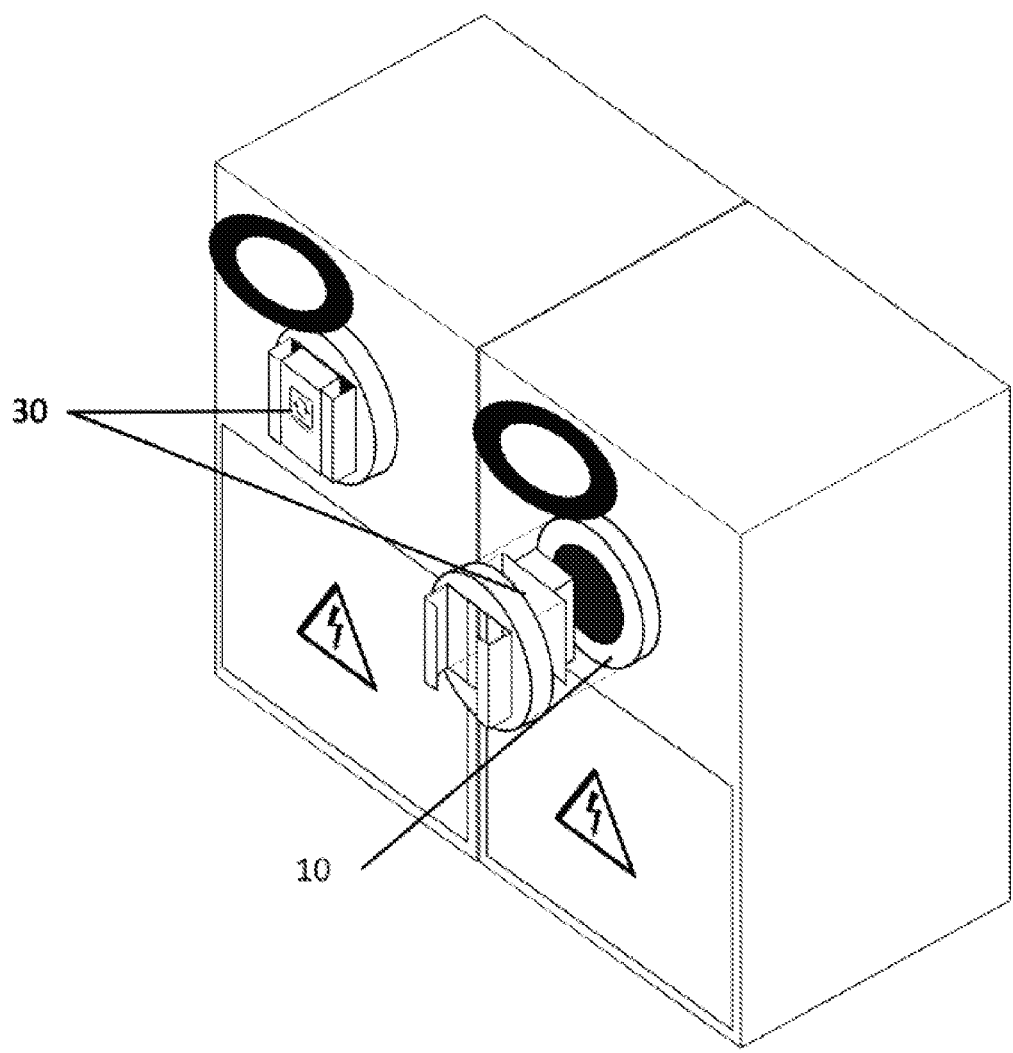
FIG. 2 is an upper perspective view of the present invention. This figure shows an equipment equipped with two Infrared windows (2). Equipment can have any number of such infrared windows. The two just are an illustration. The windows do have a possible embodiment of the invention mounted onto the infrared windows (1).
Figure 3:
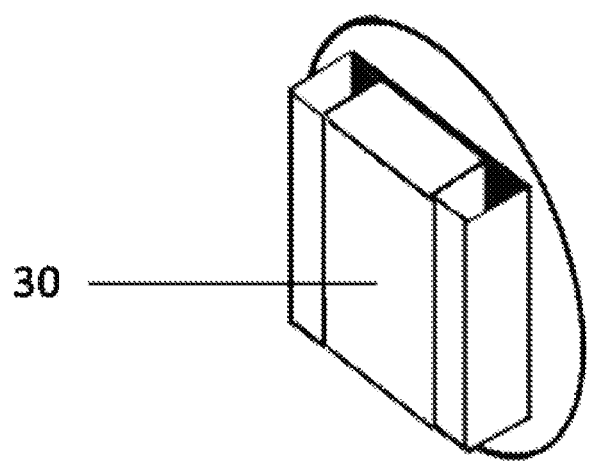
FIG. 3 is a side perspective view of the present invention. This figure shows a possible embodiment of the solution whereby an existing thermal infrared sensor is mounted into an enclosure that can be fitted onto infrared windows.

The first and second element can be combined into one unit. However, it could also be separate units that can be combined into as shown in FIG. 2 and FIG. 3. This non limitative embodiment shows a possible embodiment of the invention whereby an existing thermal infrared sensor is plugged into the IR mount (first element). This illustrates a modular, changeable configuration where the mount is an add-on of an existing thermal infrared sensor.

The invention's goal is to offer an alternative solution to the current way of monitoring thermal conditions of objects through Infrared windows. The current way typically is a manual and period process that sometimes can even pause physical risks to the operator. It often requires a manual processing of information gathered through the inspection.

With the invention a new approach to thermal monitoring through Infrared windows can be introduced by leveraging existing technology (thermal infrared sensors and/or cameras).

If desired, the invention enables the user of the invention to automate the manual process and perform continuous monitoring of objects instead of periodic monitoring. The presented invention brings safety, operations reliability, alerting and automated reporting capabilities that are not present in the current form of using Infrared windows.

What has been described and illustrated herein is a preferred embodiment of the present invention along with some of its variations. The terms, descriptions and figures used herein are set forth by way of illustration only and are not meant as limitations. Those skilled in the art will recognize that many variations are possible within the spirit and scope of the present invention in which all terms are meant in their broadest, reasonable sense unless otherwise indicated. Any headings utilized within the description are for convenience only and have no legal or limiting effect.

Thus, it is appreciated that the optimum dimensional relationships for the parts of the present invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the present invention should be determined by the appended claims and their legal equivalents, rather than by the examples given.

The embodiments of the present invention in which an exclusive property or privilege is claimed are defined as follows:

1. An infrared inspection window mountable thermal infrared sensor and mount device for retrofitting an infrared inspection window located on a switchgear enclosure designed to permit infrared inspections of electrical components located within the switchgear enclosure comprising:
    a mountable thermal imaging sensor;
    a mount;
    an infrared inspection window located on a switchgear enclosure designed to permit infrared inspections of electrical components located within the switchgear enclosure;
    the mount retrofittingly fixing the thermal imaging sensor to the infrared inspection window located on a switchgear enclosure designed to permit infrared inspections of electrical components located within the switchgear enclosure;
    one or more monitoring systems connected to the mountable thermal imaging sensor enabling thermal monitoring of electrical components located specifically within the switchgear enclosure;
    the thermal imaging sensor connected to the mount for retrofittingly fixing the thermal imaging sensor to the infrared inspection window located on a switchgear enclosure designed to permit infrared inspections of electrical components located within the switchgear enclosure; and the thermal imaging sensor making thermal temperature data available over industrial protocols to the one or more monitoring systems providing thermal monitoring of electrical components located specifically within the switchgear enclosure.

2. The device of claim 1, wherein the thermal imaging sensor retrofittingly connects onto the infrared inspection window located on a switchgear enclosure designed to permit infrared inspections of electrical components located within the switchgear enclosure via the mount; and the thermal imaging sensor performs continuous thermal monitoring of electrical components located within the switchgear enclosure.

3. The device of claim 1, further comprising an infrared inspection window mount kit, defining the infrared inspection window mount, retrofitted onto the infrared inspection window located on a switchgear enclosure designed to permit infrared inspections of electrical components located within the switchgear enclosure.

4. The device of claim 3, wherein the infrared inspection window mount is an enclosure that retrofittingly fits onto the infrared inspection window located on a switchgear enclosure designed to permit infrared inspections of electrical components located within the switchgear enclosure.

5. The device of claim 3, wherein the infrared inspection window mount is an enclosure that retrofittingly fits around the infrared inspection window located on a switchgear enclosure designed to permit infrared inspections of electrical components located within the switchgear enclosure.

6. The device of claim 3, wherein the infrared inspection window mount is an enclosure that retrofittingly fits over the infrared inspection window located on a switchgear enclosure designed to permit infrared inspections of electrical components located within the switchgear enclosure.

7. The device of claim 3, wherein the mount retrofittingly attached to the infrared inspection window or enclosure surrounding the infrared inspection window located on a switchgear enclosure designed to permit infrared inspections of electrical components located within the switchgear enclosure.

8. The device of claim 3, wherein the mount fully or partially covering the infrared inspection window located on a switchgear enclosure designed to permit infrared inspections of electrical components located within the switchgear enclosure.

9. The device of claim 3, wherein the mount fully or partially covers the infrared inspection window located on a switchgear enclosure designed to permit infrared inspections of electrical components located within the switchgear enclosure; or the mount fully or partially covers a plurality of infrared inspection windows located on a switchgear enclosure designed to permit infrared inspections of electrical components located within the switchgear enclosure.

10. The device of claim 3, wherein the mount is made specifically for one or more types of infrared inspection windows; or is a generic mount.

\* \* \* \* \*